(12) United States Patent
Lollie et al.

(10) Patent No.: US 12,649,423 B2
(45) Date of Patent: Jun. 9, 2026

(54) VEHICLE MOUNTED BICYCLE CARRIER

(71) Applicants: Teresa Lollie, Duncan (CA); Walter Nemanishen, Duncan (CA)

(72) Inventors: Teresa Lollie, Duncan (CA); Walter Nemanishen, Duncan (CA)

( * ) Notice: Subject to any disclaimer, the term of this patent is extended or adjusted under 35 U.S.C. 154(b) by 113 days.

(21) Appl. No.: 18/579,138

(22) PCT Filed: Jul. 13, 2022

(86) PCT No.: PCT/CA2022/051095
§ 371 (c)(1),
(2) Date: Jan. 12, 2024

(87) PCT Pub. No.: WO2023/283738
PCT Pub. Date: Jan. 19, 2023

(65) Prior Publication Data
US 2024/0336206 A1      Oct. 10, 2024

(30) Foreign Application Priority Data
Jul. 14, 2021    (CA) ...................................... 3124549

(51) Int. Cl.
B60R 9/10          (2006.01)
B60R 9/06          (2006.01)
(52) U.S. Cl.
CPC . B60R 9/10 (2013.01); B60R 9/06 (2013.01)
(58) Field of Classification Search
CPC .................................... B60R 9/10; B60R 9/06
See application file for complete search history.

(56) References Cited

U.S. PATENT DOCUMENTS

| | | | | |
|---|---|---|---|---|
| 4,050,616 A | * | 9/1977 | Mosow ..................... | B60R 9/06 |
| | | | | 224/532 |
| 5,695,103 A | | 12/1997 | Duvernay et al. | |
| 9,096,182 B1 | | 8/2015 | Roth et al. | |
| 9,108,574 B1 | * | 8/2015 | Shen ......................... | B60R 9/10 |
| 12,330,595 B1 | * | 6/2025 | Fortune .................... | B60R 9/06 |
| | | (Continued) | | |

FOREIGN PATENT DOCUMENTS

| | | |
|---|---|---|
| EP | 2848473 | 3/2015 |
| KR | 10-0940797 | 12/2009 |

OTHER PUBLICATIONS

Saris, "The Saris Door County | Know No. Bounds", Youtube video, URL: < www.youtube.com/watch?v=Ac7xJalsEA8 > May 25, 2021.
(Continued)

*Primary Examiner* — Brian D Nash

(57)          ABSTRACT
A vehicle mounted bicycle carrier has a telescopic assembly which comprises a first tubular member and a second tubular member. The second tubular member is movable between an extended position wherein the second tubular member extends relatively more from the first tubular member and a retracted position wherein the second tubular member extends relatively less from the first tubular member. A mounting assembly is secured to the first tubular member. A bicycle support is secured to the second tubular member. A drive unit is provided which selectively moves the second tubular member from the retracted position to the extended position and from the extended position to the retracted position, thereby raising and lowering the bicycle support.

12 Claims, 7 Drawing Sheets

(56)                    References Cited

U.S. PATENT DOCUMENTS

| | | | | |
|---|---|---|---|---|
| 2007/0007316 A1* | 1/2007 | Witczak | ................. | B60R 9/042 224/310 |
| 2007/0024024 A1* | 2/2007 | Maynard | ................... | B60R 9/06 280/402 |
| 2007/0205617 A1* | 9/2007 | Hahn | ................... | B60P 1/6481 293/119 |
| 2008/0206030 A1 | 8/2008 | Reuille et al. | | |
| 2008/0250984 A1 | 10/2008 | Panzarella et al. | | |
| 2012/0125964 A1 | 5/2012 | Sautter et al. | | |
| 2013/0062383 A1* | 3/2013 | Jeli | .......................... | B60R 9/10 224/549 |
| 2013/0142602 A1 | 6/2013 | Barnts | | |
| 2014/0169918 A1* | 6/2014 | Buller | .................... | B60P 1/486 414/462 |
| 2014/0299642 A1* | 10/2014 | Schatz | ..................... | B60R 9/10 224/496 |
| 2016/0068111 A1 | 3/2016 | Walker et al. | | |
| 2018/0072237 A1* | 3/2018 | Kuschmeader | .......... | B60R 9/10 |
| 2018/0361943 A1* | 12/2018 | Ellenbogen | ............. | B60R 9/042 |
| 2024/0208429 A1* | 6/2024 | Whited, Jr. | .............. | B60R 9/06 |
| 2025/0145089 A1* | 5/2025 | White | ..................... | B60R 9/06 |

OTHER PUBLICATIONS

Motwo, "The MOTOW Hitch Lift with Double eBike Carrier Installation Video—Simplify your life", Youtube video, URL: < https://www.youtube.com/watch?v=5UhtqZJZHfo > Oct. 30, 2020.
International Search Report; Canadian Patent Office; International Application No. PCT/CA2022/051095; Oct. 3, 2022; 6 pages.
Written Opinion of the International Searching Authority; Canadian Patent Office; International Application No. PCT/CA2022/051095; Oct. 3, 2022; 6 pages.

* cited by examiner

VEHICLE MOUNTED BICYCLE CARRIER

FIELD

There is described a bicycle carrier that mounts to a vehicle for the purpose of transporting a bicycle.

BACKGROUND

The following patents are examples of bicycle carriers that mount to a vehicle, U.S. Pat. No. 3,529,737 (Daugherty), U.S. Pat. No. 5,833,074 (Phillips) and U.S. Pat. No. 6,244,483 (McLemore et al).

SUMMARY

There is provided a vehicle mounted bicycle carrier with a telescopic assembly which comprises a first tubular member and a second tubular member. The second tubular member has a first end and a second end. The first end of the second tubular member is telescopically received within the first tubular member. The second tubular member is movable between an extended position wherein the second tubular member extends relatively more from the first tubular member and a retracted position wherein the second tubular member extends relatively less from the first tubular member. A mounting assembly is secured to the first tubular member. The mounting assembly is used to mount the tubular assembly to a vehicle in a vertical orientation with the second end of the second tubular member being in a downward orientation. A bicycle support is secured toward the second end of the second tubular member. A drive unit is provided which selectively moves the second tubular member from the retracted position to the extended position and from the extended position to the retracted position, thereby raising and lowering the bicycle support.

The bicycle carrier, as described above, is capable of lowering the bicycle support to ground level in order to receive a bicycle. The bicycle support is then raised, so that the bicycle can be safely transported by vehicle. Once the vehicle arrives at a location where the bicycle is to be ridden, the bicycle support is again lowered to ground level for the off-loading of the bicycle.

The advantage that the above-described bicycle carrier provides is that it is not necessary to lift the bicycle onto the bicycle carrier. These and other aspects of the bicycle carrier will hereinafter be described in the description which follows.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
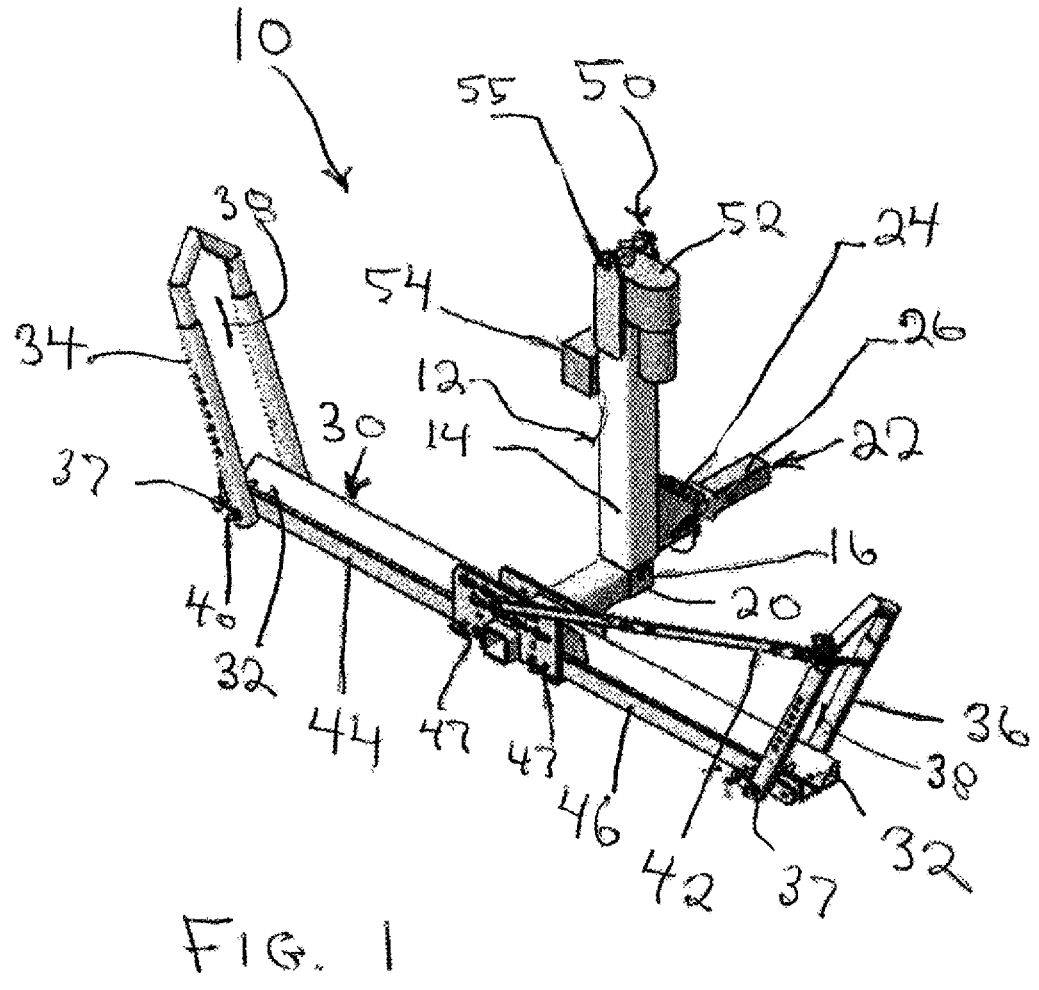
FIG. 1 is a perspective view of a bicycle carrier that mounts to a vehicle.

A bicycle carrier generally identified by reference numeral 10, will now be described with reference to FIG. 1 through FIG. 7.

Figures 4, 5:
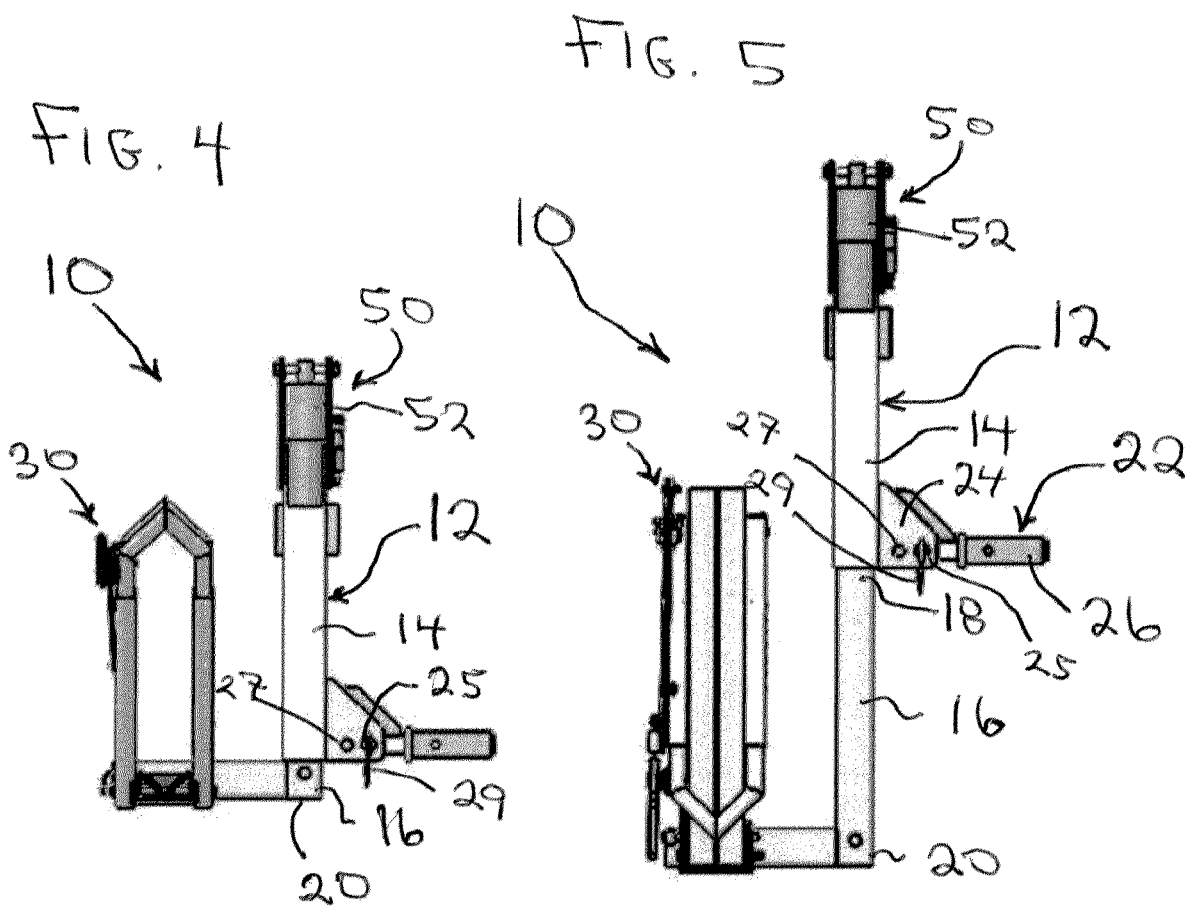
FIG. 4 is an end elevation view of the bicycle carrier of FIG. 1, with a telescopic assembly in a retracted position.
FIG. 5 is an end elevation view of the bicycle carrier of FIG. 1, with the telescopic assembly in an extended position.

Structure and Relationship of Parts:

Referring to FIG. 4 and FIG. 5, bicycle carrier 10 has a main body which is a telescopic assembly, generally indicated by reference numeral 12, comprising a first tubular member 14 and a second tubular member 16. Referring to FIG. 5, second tubular member 16 has a first end 18 and a second end 20 (remote end). First end 18 of second tubular member 16 is telescopically received within first tubular member 14. Second tubular member 16 is telescopically movable between an extended position illustrated in FIG. 5 wherein second tubular member 16 extends relatively more from first tubular member 14 and a retracted position illustrated in FIG. 4 wherein second tubular member 16 extends relatively less from first tubular member 14.

Referring to FIG. 1, a mounting assembly, generally indicated by reference numeral 22, is secured to first tubular member 14. Mounting assembly 22 is used to mount tubular assembly 12 to a vehicle in a vertical orientation. Referring to FIG. 5, when in the correct vertical orientation second end 20 of second tubular member 16 is in a downward orientation. Mounting assembly 22, as illustrated, comprises coupling 24 mounted to first tubular member 14. Coupling 24 supports a square hitch pin 26 which is designed to mate with a female receiver (not shown) mounted to a vehicle. The mounting assembly will not be further described, as the use of a square hitch pin is known. It will be understood that there are alternative mounting assemblies which could have been used.

Referring to FIG. 4 and FIG. 5, there is one aspect of mounting assembly 22 that deserves further mention. When mounting assembly is mounted to a vehicle having a pivoting rear cargo door, there may be a need for additional clearance to accommodate the opening and closing of the rear cargo door. Coupling 24 which supports square hitch pin 26 has two mounting apertures 25 and 27. When cotter pins 29 are inserted in both mounting aperture 25 and mounting aperture 27, tubular assembly is maintained in a perpendicular relationship to square hitch pin 26. However, when access to rear cargo door is desired, the cotter pin 29 in mounting aperture 27 is removed. This results in a pivotal movement about the cotter pin 29 in mounting aperture 25, which places tubular assembly in an angular position to allow clearance. After cargo is loaded, the rear cargo door is then closed, tubular assembly is raised, and the cotter pin is inserted into mounting apertures 27 in preparation for transport.

Figure 2:
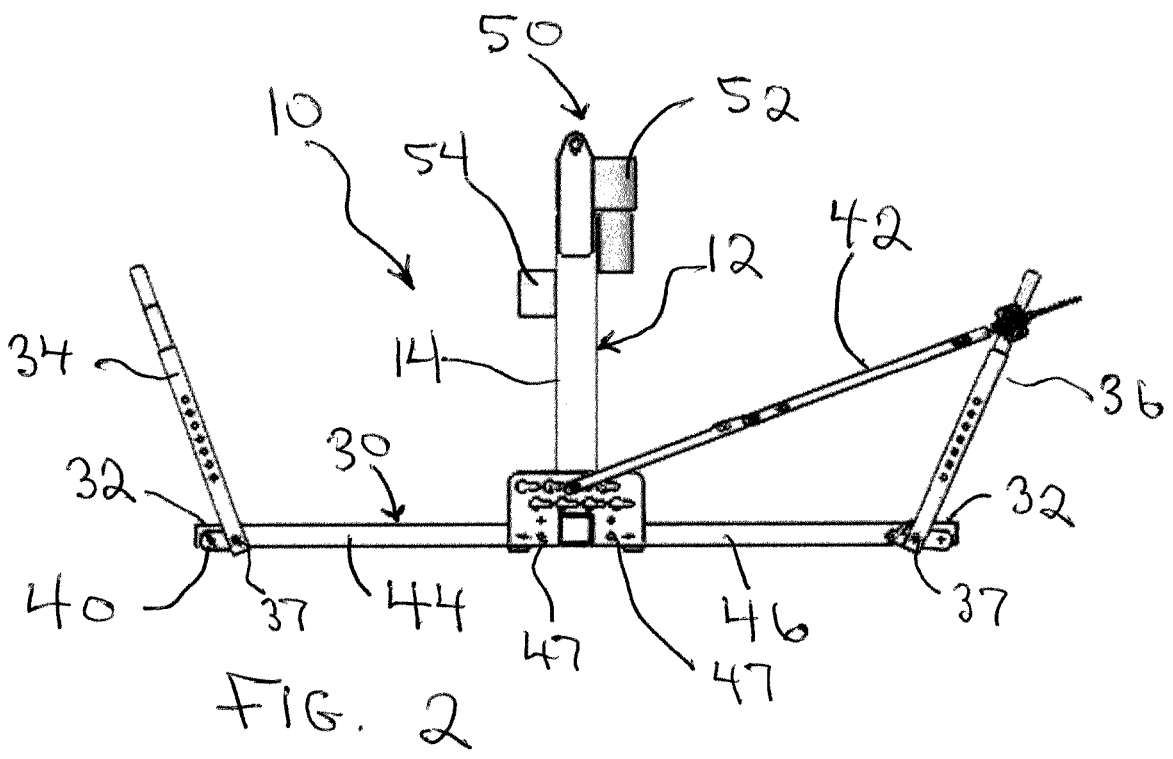
FIG. 2 is a front elevation view of the bicycle carrier of FIG. 1, with a bicycle support in an operative position ready to receive a bicycle.
Figure 6:
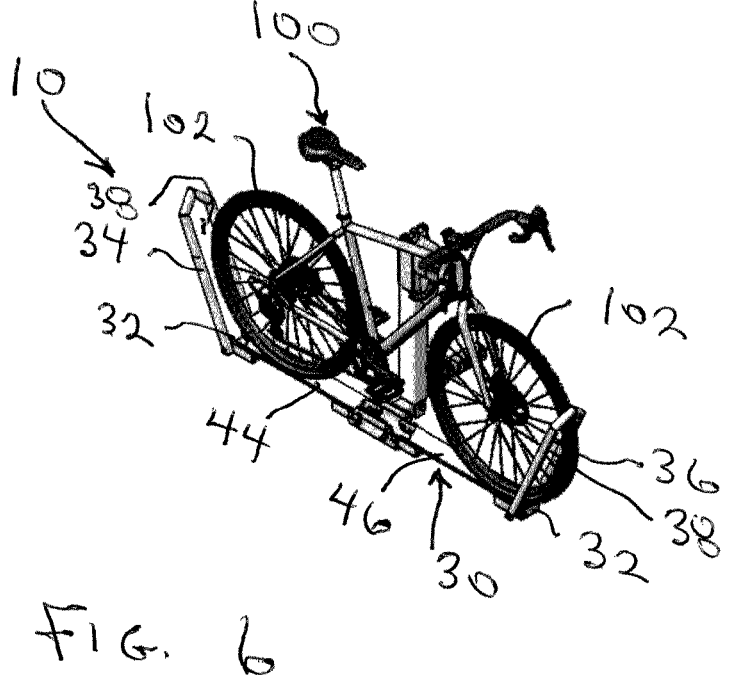
FIG. 6 is a perspective view of a bicycle positioned on the bicycle carrier of FIG. 1.
Figure 7:
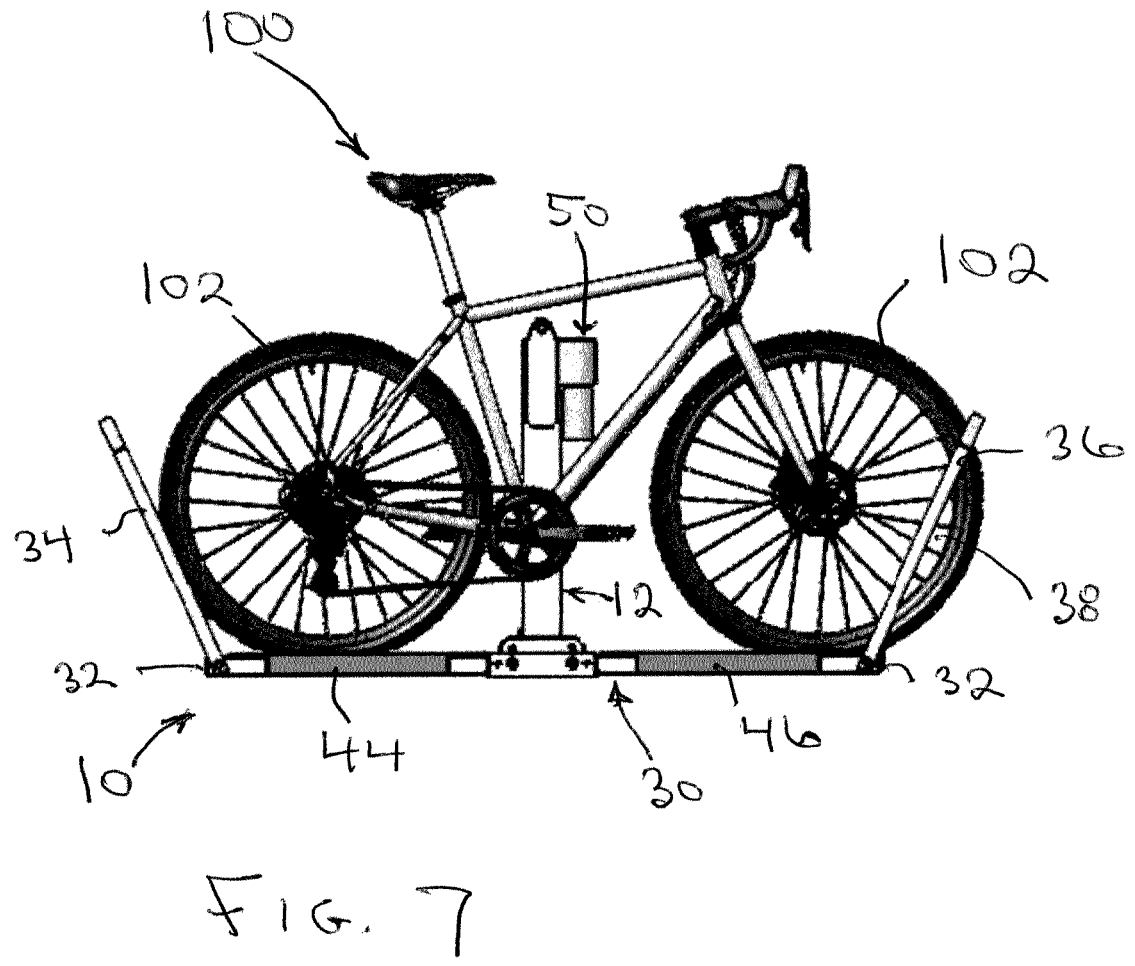
FIG. 7 is a front elevation view of the bicycle positioned on the bicycle carrier of FIG. 6.

Referring to FIG. 1, a bicycle support, generally identified by reference numeral 30 is secured in a cantilever manner to second end 20 of second tubular member 16. Referring to FIG. 6 and FIG. 7, bicycle support 30 is adapted to support a bicycle 100 in a horizontal orientation. Referring to FIG. 1 and FIG. 2, bicycle support 30 has opposed ends 32. Tire lock arms 34 and 36 are pivotally mounted at pivot 37 to opposed ends 32 of bicycle support 30. Referring to FIG. 1, tire lock arms 34 and 36 both have a tire engagement cavity 38. Referring to FIG. 6 and FIG. 7, it can be seen how by pivoting tire lock arms 34 and 36 into a position in which a tire 102 of bicycle 100 is captured in tire engagement cavity 38, bicycle 100 can be secured to bicycle support 30. It is to be noted that a pivotal stop 40 limits rotation of tire lock arm 34. It is to be noted that a locking brace 42 is used to lock tire lock arm 36 into engagement with tire 102. Tire 102 cannot be released until locking brace 42 is removed to allow tire lock arm 36 to be pivoted to release tire 102 from tire engagement cavity 38. It should also be noted that in order to facilitate loading of bicycle 100, tire locking arm 36 is lowered until it rests on the ground. This allows bicycle 100 to be rolled over tire locking arm 36 onto bicycle support 30.

Tire lock arms 34 and 36 have been chosen for illustration as a suitable means for securing bicycle 100 to bicycle support 30. Some bicycles have fenders and other bicycles do not have fenders. It will be understood that the sizing of tire lock arms 34 and 36 may vary depending upon whether bicycle carrier 10 is to be used with bicycles having fenders or not having fenders. It will be understood that the manner of securing bicycle 100 to bicycle support 30 may vary depending upon whether bicycle carrier 10 is to be used with bicycles having fenders or not having fenders.

Figure 3:
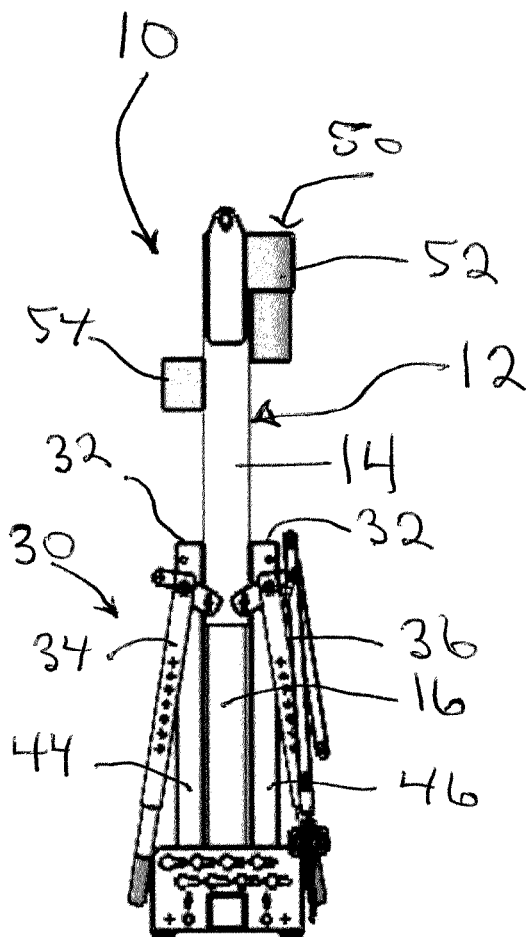
FIG. 3 is a front elevation view of the bicycle carrier of FIG. 2, with the bicycle support in a stored position with support members folded.

When bicycle support 30 is not in use supporting bicycle 100, it is preferred that bicycle support 30 be capable of being folded. Referring to FIG. 2 and FIG. 3, bicycle support 30 comprises two pivoting support arms 44 and 46, which pivot about pivot 47. Support arms 44 and 46 pivot between a substantially vertical stored position illustrated in FIG. 3 and a substantially horizontal operative position illustrated in FIG. 1 and FIG. 2. Referring to FIG. 3, it is to be noted that tire lock arm 34 and tire lock arm 36 fold to enable bicycle support 30 to assume a relatively compact configuration.

Referring to FIG. 1, a drive unit, generally identified by reference numeral 50, is provided. Drive unit 50 comprises a linear actuator 52 which is powered by a battery pack 54. Linear actuator 52 is secured to first tubular member 14 by mounting plates 55. Referring to FIG. 4 and FIG. 5, when selectively activated drive unit 50 moves second tubular member 16 from the retracted position illustrated in FIG. 4 to the extended position illustrated in FIG. 5 or, conversely, from the extended position illustrated in FIG. 5 to the retracted position illustrated in FIG. 4, thereby raising and lowering bicycle support 30.

Figures 8, 9:
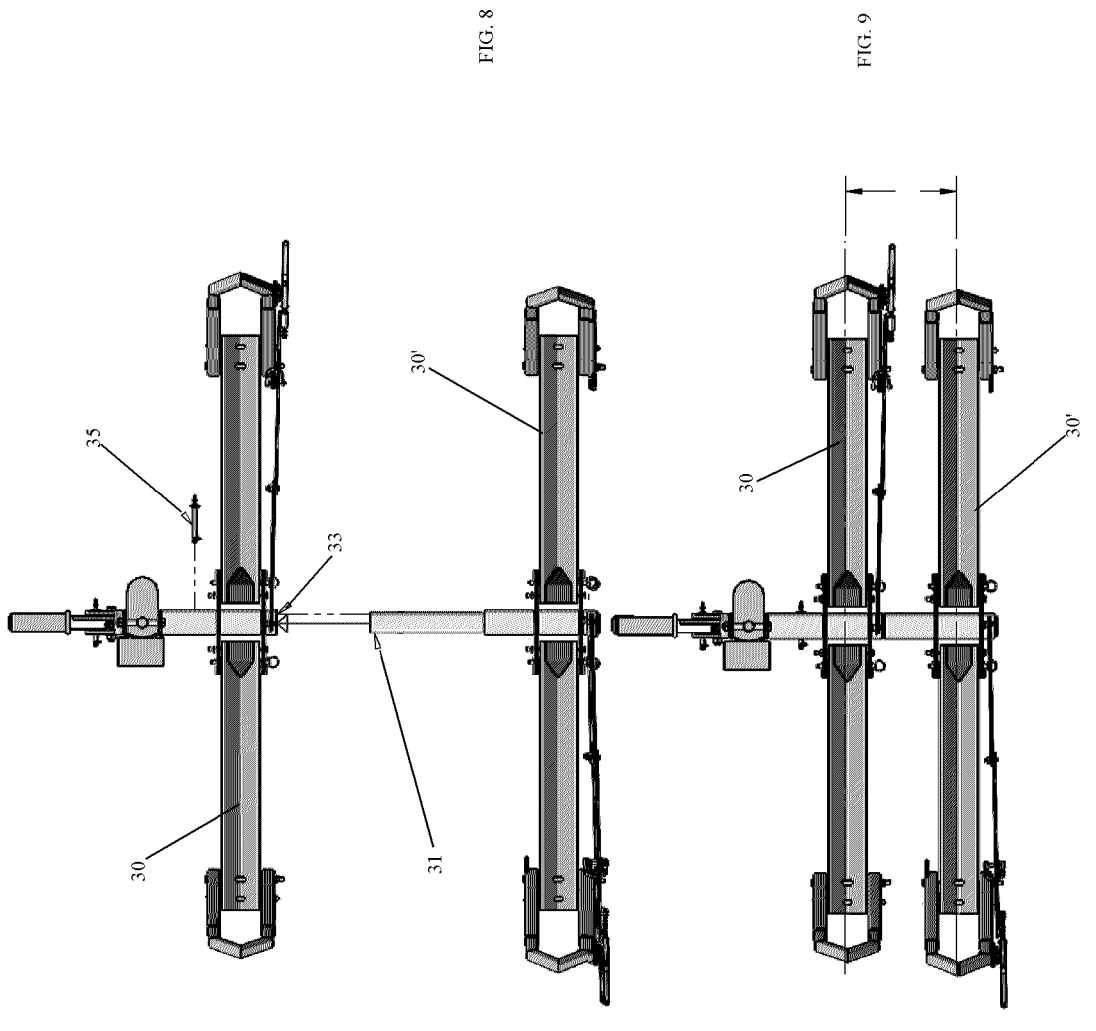
FIG. 8 is an exploded top plan view of the bicycle carrier of FIG. 1 modified to carry more than one bicycle.\
FIG. 9 is a top plan view of the bicycle carrier of FIG. 8.

FIG. 1 through FIG. 7 show bicycle support 30 as supporting a single bicycle. It will be understood that twinning the support configuration that bicycle support 30 can be adapted to hold two bicycles. Referring to FIG. 8 and FIG. 9, bicycle support 30 is designed to receive in parallel spaced relation a second bicycle support 30' by inserting a male member 31 of second bicycle support 30' into a female receiver 33 in bicycle support 30 and securing it in position with a lock pin 35. It will be further understood that the configuration of bicycle support 30 can be modified to hold three or more bicycles, by mating a third bicycle support with the second bicycle support, by mating a fourth bicycle support with the third bicycle support and so on.

Operation:

Referring to FIG. 4 and FIG. 5, mounting assembly 22 is used to mount tubular assembly 12 to a vehicle in a vertical orientation. Drive unit 50 is then activated to move second tubular member 16 from the retracted position illustrated in FIG. 4 to the extended position illustrated in FIG. 5, thereby lowering bicycle support 30 to ground level in preparation for loading. Referring to FIG. 3 and FIG. 2, support arms 44 and 46 are pivoted from the substantially vertical stored position illustrated in FIG. 3 and to the substantially horizontal operative position illustrated in FIG. 2. Tire lock arm 36 is lowered to rest on the ground, providing a path for the loading of bicycle 100. Referring to FIG. 6 and FIG. 7, bicycle 100 is rolled onto bicycle support 30. Tire lock arms 34 and 36 are pivoted into a position in which a tire 102 of bicycle 100 is captured in tire engagement cavity 38 in order to secure bicycle 100 to bicycle support 30. Pivotal stop 40 limits rotation of tire lock arm 34. Tire lock arm 36 is raised and locking brace 42 is used to lock tire lock arm 36 into engagement with tire 102. Tire 102 cannot be released until locking brace 42 is removed to allow tire lock arm 36 to be pivoted to release tire 102 from tire engagement cavity 38. Drive unit 50 is then activated to move second tubular member 16 from the extended position illustrated in FIG. 5 to the retracted position illustrated in FIG. 4, thereby raising bicycle support 30 in preparation for transport.

Referring to FIG. 8 and FIG. 9, for reasons of safety, it is preferred that, with a single bicycle 100, support 30 be configured to load bicycle 100 from the passenger side of the vehicle (sidewalk side when parked), rather than the driver side of the vehicle where vehicular traffic goes. When two or more bicycles are being loaded, the orientation of the bicycles is alternated so that the handlebars of one bicycle is toward tire lock arm 34 and the handlebars of the next bicycle is toward tire lock arm 36. This may require that one bicycle be rolled forward onto bicycle support 30 from the passenger side and the next bicycle be rolled onto bicycle support 30' from the driver side.

Upon arrival at the destination, drive unit 50 is again activated to move second tubular member 16 from the retracted position illustrated in FIG. 4 to the extended position illustrated in FIG. 5, thereby lowering bicycle support 30 to ground level in preparation for unloading. Locking brace 42 is removed to allow tire lock arm 36 to be pivoted to release tire 102 from tire engagement cavity 38. Bicycle 100 can then be rolled off of bicycle support 30.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the claims should not be limited by the illustrated embodiments set forth as examples but should be given the broadest interpretation consistent with a purposive construction of the claims in view of the description as a whole.

The invention claimed is:

1. A vehicle mounted bicycle carrier, comprising:
 a telescopic assembly comprising a first tubular member and a second tubular member, the second tubular member having a first end and a second end, the first end of the second tubular member being telescopically received within the first tubular member, the second tubular member being movable between an extended position wherein the second tubular member extends relatively more from the first tubular member and a retracted position wherein the second tubular member extends relatively less from the first tubular member;
 a mounting assembly secured to the first tubular member and adapted to mount the telescopic assembly to a vehicle in a vertical orientation with the second end of the second tubular member being in a downward orientation;

at least one bicycle support secured toward the second end of the second tubular member;

a drive unit selectively moving the second tubular member from the retracted position to the extended position and from the extended position to the retracted position, thereby raising and lowering the at least one bicycle support; and wherein the telescopic assembly is connected to the mounting assembly by an adjustable mounting, wherein the adjustable mounting comprises first and second mounting apertures and first and second pins insertable into the first and second mounting apertures, and wherein the mounting assembly is configured to selectively accommodate limited pivotal movement of the telescopic assembly and the adjustable mounting relative to the mounting assembly by removing one of the first and second pins from the mounting aperture into which it is inserted, wherein the first and second pins define respective first and second longitudinal axes and are insertable into the first and second mounting apertures by inserting the first and second pins into the first and second mounting apertures by respectively translating the first and second pins along the first and second longitudmal axes, and wherein the mounting assembly is configured to selectively accommodate limited pivotal movement of the telescopic assembly and the adjustable mounting relative to the mounting assembly by removing one of the first and second pins from the mounting aperture into which it is inserted by translating the one of the first and second pins along its longitudinal axis.

2. The vehicle mounted bicycle carrier of claim 1, wherein the at least one bicycle support is adapted to support at least one bicycle in a horizontal orientation.

3. The vehicle mounted bicycle carrier of claim 1, wherein each bicycle support of the at least one bicycle support is comprised of a pair of pivoting support arms, which pivot between a substantially vertical stored position and a substantially horizontal operative position.

4. The vehicle mounted bicycle carrier of claim 1, wherein tire lock arms are pivotally mounted to opposed ends of each bicycle support of the at least one bicycle support, each tire lock arm having a tire engagement cavity for receiving therein a tire of a bicycle.

5. The vehicle mounted bicycle carrier of claim 1, wherein the at least one bicycle support accommodates more than one bicycle.

6. The vehicle mounted bicycle carrier of claim 1, wherein the at least one bicycle support comprises a first bicycle support and a second bicycle support, wherein each of the first and second bicycle supports is adapted to support a single bicycle in a horizontal orientation, and wherein the first bicycle support comprises a male member for releasably mating with a female member of the second bicycle support, thereby enabling the first bicycle support to be releasably connected to the second bicycle support.

7. The vehicle mounted bicycle carrier of claim 1, further comprising a battery mounted to the bicycle carrier for powering the drive unit.

8. The vehicle mounted bicycle carrier of claim 7, wherein the battery is mounted to the telescopic assembly.

9. The vehicle mounted bicycle carrier of claim 7, wherein the first and second pins are cotter pins.

10. The vehicle mounted bicycle carrier of claim 1, wherein edges of the first and second mounting apertures do not meet edges of the adjustable mounting.

11. The vehicle mounted bicycle carrier of claim 1, wherein the adjustable mounting comprises at least one surface bounded by a periphery, and wherein the first and second mounting apertures are comprised in the at least one surface and are spaced from the periphery.

12. A vehicle mounted bicycle carrier, comprising: a telescopic assembly comprising a first tubular member and a second tubular member, the second tubular member having a first end and a second end, the first end of the second tubular member being telescopically received within the first tubular member, the second tubular member being movable between an extended position wherein the second tubular member extends relatively more from the first tubular member and a retracted position wherein the second tubular member extends relatively less from the first tubular member, a mounting assembly secured to the first tubular member and adapted to mount the telescopic assembly to a vehicle in a vertical orientation with the second end of the second tubular member being in a downward orientation; at least one bicycle support secured toward the second end of the second tubular member; a drive unit selectively moving the second tubular member from the retracted position to the extended position and from the extended position to the retracted position, thereby raising and lowering the at least one bicycle support; and wherein the telescopic assembly is connected to the mounting assembly by an adjustable mounting, wherein the adjustable mounting comprises first and second mounting apertures and first and second pins insertable into the first and second mounting apertures, and wherein the mounting assembly is configured to selectively accommodate limited pivotal movement of the telescopic assembly and the adjustable mounting relative to the mounting assembly by removing one of the first and second pins from the mounting aperture into which it is inserted; wherein the at least one bicycle support comprises a first bicycle support and a second bicycle support, wherein each of the first and second bicycle supports is adapted to support a single bicycle in a horizontal orientation, and wherein the first bicycle support comprises a male member for releasably mating with a female member of the second bicycle support, thereby enabling the first bicycle support to be releasably connected to the second bicycle support.

* * * * *